United States Patent
Harris et al.

(10) Patent No.: US 10,547,444 B2
(45) Date of Patent: Jan. 28, 2020

(54) CLOUD ENCRYPTION KEY BROKER APPARATUSES, METHODS AND SYSTEMS

(71) Applicant: Visa International Service Association, San Francisco, CA (US)

(72) Inventors: Theodore Harris, San Francisco, CA (US); Scott Edington, Arlington, VA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 6 days.

(21) Appl. No.: 15/045,435

(22) Filed: Feb. 17, 2016

(65) Prior Publication Data
US 2016/0241390 A1    Aug. 18, 2016

Related U.S. Application Data

(60) Provisional application No. 62/117,080, filed on Feb. 17, 2015.

(51) Int. Cl.
*H04L 29/06* (2006.01)
*H04L 9/08* (2006.01)
*G06F 21/60* (2013.01)

(52) U.S. Cl.
CPC ............ *H04L 9/083* (2013.01); *G06F 21/602* (2013.01); *H04L 9/085* (2013.01)

(58) Field of Classification Search
CPC ......... H04L 9/083; H04L 63/06; H04L 9/085; G06F 21/602
See application file for complete search history.

(56) References Cited

U.S. PATENT DOCUMENTS

| | | | | |
|---|---|---|---|---|
| 5,222,136 A * | 6/1993 | Rasmussen | ........... | H04L 9/0625 380/266 |
| 5,237,611 A * | 8/1993 | Rasmussen | ........... | H04L 9/0822 380/243 |
| 5,301,247 A * | 4/1994 | Rasmussen | ........... | H04L 9/0844 380/277 |
| 5,535,276 A * | 7/1996 | Ganesan | ............... | H04L 9/0825 380/46 |
| 5,737,419 A * | 4/1998 | Ganesan | ................. | H04L 9/083 380/286 |
| 5,748,735 A * | 5/1998 | Ganesan | ................. | H04L 9/083 380/282 |
| 5,784,463 A * | 7/1998 | Chen | ....................... | G06F 21/33 380/282 |
| 6,385,316 B1* | 5/2002 | Rose | .................... | H04L 9/0618 380/259 |

(Continued)

OTHER PUBLICATIONS

International Search Report and Written Opinion issued in connection with corresponding application No. PCT/US2016/015165 dated Apr. 22, 2016 (12 pages).

(Continued)

*Primary Examiner* — David Garcia Cervetti
(74) *Attorney, Agent, or Firm* — Loeb & Loeb, LLP

(57) ABSTRACT

Computer-implemented systems and methods are disclosed herein for use in cryptographic operations over a cloud-based service. The cloud-based service securely stores and transmits parts of encryption/decryption keys. Split key processing can include splitting the key in two and storing one of them on a remote secure server.

20 Claims, 8 Drawing Sheets

(56) References Cited

U.S. PATENT DOCUMENTS

| | | | | |
|---|---|---|---|---|
| 6,636,966 B1* | 10/2003 | Lee | | G06F 21/10 |
| | | | | 713/165 |
| 7,051,211 B1* | 5/2006 | Matyas, Jr. | | G06F 21/10 |
| | | | | 380/201 |
| 7,069,435 B2* | 6/2006 | Sandhu | | H04L 9/0825 |
| | | | | 380/279 |
| 7,085,744 B2* | 8/2006 | Morrison | | G06Q 20/12 |
| | | | | 340/5.1 |
| 7,299,357 B2* | 11/2007 | Karamchedu | | G06F 21/606 |
| | | | | 380/278 |
| 7,788,501 B2* | 8/2010 | Abdallah | | H04L 9/3231 |
| | | | | 713/186 |
| 8,290,165 B2* | 10/2012 | Allen | | H04L 9/0825 |
| | | | | 380/277 |
| 8,423,789 B1* | 4/2013 | Poo | | G06F 21/602 |
| | | | | 380/44 |
| 9,113,042 B2* | 8/2015 | Bennett | | H04L 63/18 |
| 9,160,535 B2* | 10/2015 | Burchett | | H04L 9/3213 |
| 9,231,925 B1* | 1/2016 | Lundstrom | | H04L 9/30 |
| 9,306,742 B1* | 4/2016 | Folkmanis | | H04L 9/085 |
| 9,455,832 B2* | 9/2016 | Brown | | H04L 9/3066 |
| 9,455,968 B1* | 9/2016 | Machani | | H04W 12/04 |
| 9,838,205 B2* | 12/2017 | Lundstrom | | H04L 63/126 |
| 2002/0078344 A1* | 6/2002 | Sandhu | | H04L 9/321 |
| | | | | 713/155 |
| 2002/0078345 A1* | 6/2002 | Sandhu | | H04L 9/0825 |
| | | | | 713/155 |
| 2002/0078346 A1* | 6/2002 | Sandhu | | H04L 9/14 |
| | | | | 713/156 |
| 2002/0078361 A1* | 6/2002 | Giroux | | H04L 63/0428 |
| | | | | 713/183 |
| 2002/0091640 A1* | 7/2002 | Gupta | | G06Q 20/382 |
| | | | | 705/51 |
| 2003/0026432 A1* | 2/2003 | Woodward | | H04L 9/085 |
| | | | | 380/278 |
| 2003/0048906 A1* | 3/2003 | Vora | | G06Q 20/00 |
| | | | | 380/277 |
| 2003/0115452 A1* | 6/2003 | Sandhu | | H04L 63/045 |
| | | | | 713/155 |
| 2003/0147536 A1* | 8/2003 | Andivahis | | H04L 63/06 |
| | | | | 380/277 |
| 2003/0226029 A1* | 12/2003 | Porter | | G06F 21/10 |
| | | | | 726/26 |
| 2004/0030893 A1* | 2/2004 | Karamchedu | | G06F 21/606 |
| | | | | 713/168 |
| 2004/0030916 A1* | 2/2004 | Karamchedu | | G06F 21/606 |
| | | | | 726/4 |
| 2004/0030917 A1* | 2/2004 | Karamchedu | | G06F 21/606 |
| | | | | 726/3 |
| 2004/0030918 A1* | 2/2004 | Karamchedu | | G06F 21/606 |
| | | | | 726/3 |
| 2004/0062400 A1* | 4/2004 | Sovio | | H04L 9/0827 |
| | | | | 380/286 |
| 2004/0114766 A1* | 6/2004 | Hileman | | G06Q 30/06 |
| | | | | 380/278 |
| 2006/0015358 A1* | 1/2006 | Chua | | G06Q 20/02 |
| | | | | 705/44 |
| 2006/0182283 A1* | 8/2006 | Sandhu | | H04L 9/0825 |
| | | | | 380/286 |
| 2006/0184788 A1* | 8/2006 | Sandhu | | H04L 63/0442 |
| | | | | 713/159 |
| 2007/0033392 A1* | 2/2007 | Ganesan | | H04L 9/0822 |
| | | | | 713/155 |
| 2007/0067618 A1* | 3/2007 | Sandhu | | H04L 9/302 |
| | | | | 713/155 |
| 2007/0150723 A1* | 6/2007 | Estable | | H04L 63/0823 |
| | | | | 713/155 |
| 2008/0056501 A1* | 3/2008 | McGough | | H04L 63/062 |
| | | | | 380/281 |
| 2008/0091947 A1* | 4/2008 | Dancer | | H04L 63/0442 |
| | | | | 713/171 |
| 2008/0170693 A1* | 7/2008 | Spies | | G06F 21/6209 |
| | | | | 380/277 |
| 2008/0172730 A1* | 7/2008 | Sandhu | | H04L 63/06 |
| | | | | 726/9 |
| 2008/0267033 A1* | 10/2008 | Morinaga | | G11B 20/00 |
| | | | | 369/84 |
| 2009/0101707 A1* | 4/2009 | Kurasaki | | G07F 7/10 |
| | | | | 235/380 |
| 2010/0125739 A1* | 5/2010 | Creary | | H04L 9/0822 |
| | | | | 713/189 |
| 2010/0131755 A1* | 5/2010 | Zhu | | H04L 63/0815 |
| | | | | 713/155 |
| 2010/0131759 A1* | 5/2010 | Pintsov | | G06Q 10/08 |
| | | | | 713/168 |
| 2010/0192201 A1* | 7/2010 | Shimoni | | G06F 21/55 |
| | | | | 726/3 |
| 2010/0299313 A1* | 11/2010 | Orsini | | H04L 9/085 |
| | | | | 707/652 |
| 2010/0325431 A1* | 12/2010 | Mordetsky | | G06F 21/629 |
| | | | | 713/167 |
| 2010/0333186 A1* | 12/2010 | Chan | | H04L 9/3236 |
| | | | | 726/10 |
| 2011/0019822 A1* | 1/2011 | Khan | | H04L 9/0643 |
| | | | | 380/255 |
| 2011/0191248 A1* | 8/2011 | Bishop | | G06Q 20/027 |
| | | | | 705/67 |
| 2011/0202755 A1* | 8/2011 | Orsini | | H04L 63/029 |
| | | | | 713/151 |
| 2011/0296440 A1* | 12/2011 | Laurich | | G06F 21/602 |
| | | | | 719/326 |
| 2012/0072736 A1* | 3/2012 | Kudoh | | G11B 20/00188 |
| | | | | 713/189 |
| 2012/0198228 A1* | 8/2012 | Oberheide | | H04L 63/062 |
| | | | | 713/155 |
| 2012/0198241 A1* | 8/2012 | O'Hare | | H04L 63/0428 |
| | | | | 713/189 |
| 2012/0254619 A1* | 10/2012 | Dhuse | | H04L 9/085 |
| | | | | 713/176 |
| 2012/0260349 A1* | 10/2012 | Nagai | | G06F 21/44 |
| | | | | 726/28 |
| 2013/0046985 A1* | 2/2013 | Allen | | H04L 9/0825 |
| | | | | 713/171 |
| 2013/0108045 A1* | 5/2013 | Sanders | | H04L 9/0847 |
| | | | | 380/260 |
| 2013/0138961 A1* | 5/2013 | Tsuji | | H04L 9/0656 |
| | | | | 713/171 |
| 2013/0185214 A1* | 7/2013 | Azen | | G06Q 20/206 |
| | | | | 705/76 |
| 2013/0226812 A1* | 8/2013 | Landrok | | G06Q 20/32 |
| | | | | 705/67 |
| 2013/0262317 A1* | 10/2013 | Collinge | | G06Q 20/3823 |
| | | | | 705/71 |
| 2013/0272521 A1* | 10/2013 | Kipnis | | H04L 9/085 |
| | | | | 380/44 |
| 2013/0290708 A1* | 10/2013 | Diaz | | H04L 41/28 |
| | | | | 713/165 |
| 2013/0291056 A1* | 10/2013 | Gaudet | | H04W 12/06 |
| | | | | 726/1 |
| 2014/0003608 A1* | 1/2014 | MacMillan | | H04L 9/0861 |
| | | | | 380/279 |
| 2014/0208112 A1* | 7/2014 | McDonald | | H04W 12/04 |
| | | | | 713/171 |
| 2014/0310527 A1* | 10/2014 | Veugen | | H04L 9/3013 |
| | | | | 713/171 |
| 2015/0047001 A1* | 2/2015 | Izumi | | G06F 21/51 |
| | | | | 726/7 |
| 2015/0235020 A1* | 8/2015 | Nagai | | G06F 21/44 |
| | | | | 726/28 |
| 2015/0372770 A1* | 12/2015 | Ouzounov | | H04B 13/005 |
| | | | | 455/41.2 |
| 2016/0080157 A1* | 3/2016 | Lundstrom | | H04L 63/126 |
| | | | | 713/176 |
| 2016/0119292 A1* | 4/2016 | Kaseda | | H04L 63/0464 |
| | | | | 713/165 |
| 2016/0125141 A1* | 5/2016 | Raisaro | | H04L 9/008 |
| | | | | 713/189 |

(56) References Cited

U.S. PATENT DOCUMENTS

2016/0132699 A1* 5/2016 Miller .................... G06F 21/80
                                                   713/193
2016/0224735 A1* 8/2016 Ayday ...................... H04L 9/14
2017/0024729 A1* 1/2017 Huxham ............... H04L 9/0844
2017/0124348 A1* 5/2017 Pourzandi ............. G06F 21/602
2017/0142579 A1* 5/2017 Gaudet ................. H04W 12/06

OTHER PUBLICATIONS

PCT International Preliminary Report on Patentability for PCT/US2016/018165, dated Aug. 31, 2017, 12 pages.
European Extended Search Report dated Aug. 18, 2018 for EP Patent Application No. 16752945.2, 11 pages.

* cited by examiner

CLOUD ENCRYPTION KEY BROKER APPARATUSES, METHODS AND SYSTEMS

PRIORITY

This application claims priority to U.S. Patent Application Ser. No. 62/117,080, filed Feb. 17, 2015 and entitled "Cloud Encryption Key Broker Apparatuses, Methods And Systems." The entire contents of the aforementioned application is expressly incorporated by reference herein.

This application for letters patent disclosure document describes inventive aspects directed at various novel innovations (hereinafter "disclosure") and contains material that is subject to copyright, mask work, and/or other intellectual property protection. The respective owners of such intellectual property have no objection to the facsimile reproduction of the disclosure by anyone as it appears in published Patent Office file/records, but otherwise reserve all rights.

FIELD

The present innovations are directed generally to multi-party encryption approaches and more particularly, to CLOUD ENCRYPTION KEY BROKER APPARATUSES, METHODS AND SYSTEMS or CEKB.

BACKGROUND

In light of recent credit card and personal information leaks the need for a more secure method for securing encryption keys is evident. In recent breaches the data was encrypted on a secure server but the keys were stolen with the data allowing the data to be exposed.

As an illustration, these breaches involved "secure" computers where a merchant stores encryption/decryption keys. When the hacker breached the secure computer, the hacker stole the key that was needed for cryptographic operations used in accessing the merchant's data. In view of this situation and others, security approaches associated with encryption/decryption operations can be improved.

BRIEF DESCRIPTION OF THE DRAWINGS

The accompanying appendices and/or drawings illustrate various non-limiting, example, innovative aspects in accordance with the present descriptions.

The leading number of each reference number within the drawings indicates the figure in which that reference number is introduced and/or detailed. As such, a detailed discussion of reference number 101 would be found and/or introduced in FIG. 1. Reference number 201 is introduced in FIG. 2, etc.

SUMMARY

Computer-implemented systems and methods are disclosed herein, such as, for use with cryptographic operations. For example, a processor-implemented system and method are disclosed for use with cryptographic operations over a cloud-based service. The cloud-based service securely stores and transmits parts of encryption/decryption keys. Split key processing can include splitting the key in two and storing one of them on a remote secure server.

As another example, a processor-implemented system and method are disclosed for cryptographic operations. A payment processor provides a cloud service that combines split key processing as well as risk analysis of requests, IP blocking and access rule restrictions to securely store and transmit parts of encryption keys.

As yet another example, a processor-impairment system and method are disclosed for cryptographic operations through a remote networked service where a first portion of a key is stored. A remote request is received for retrieval of the first portion of the key, and a security analysis is performed upon the request. The first portion of the key is transmitted to the requester after security analysis criteria has been satisfied. A complete key is generated by combining the first portion of the key with a second portion of the key. The complete key is used to perform a cryptographic operation.

DETAILED DESCRIPTION

Figure 1:
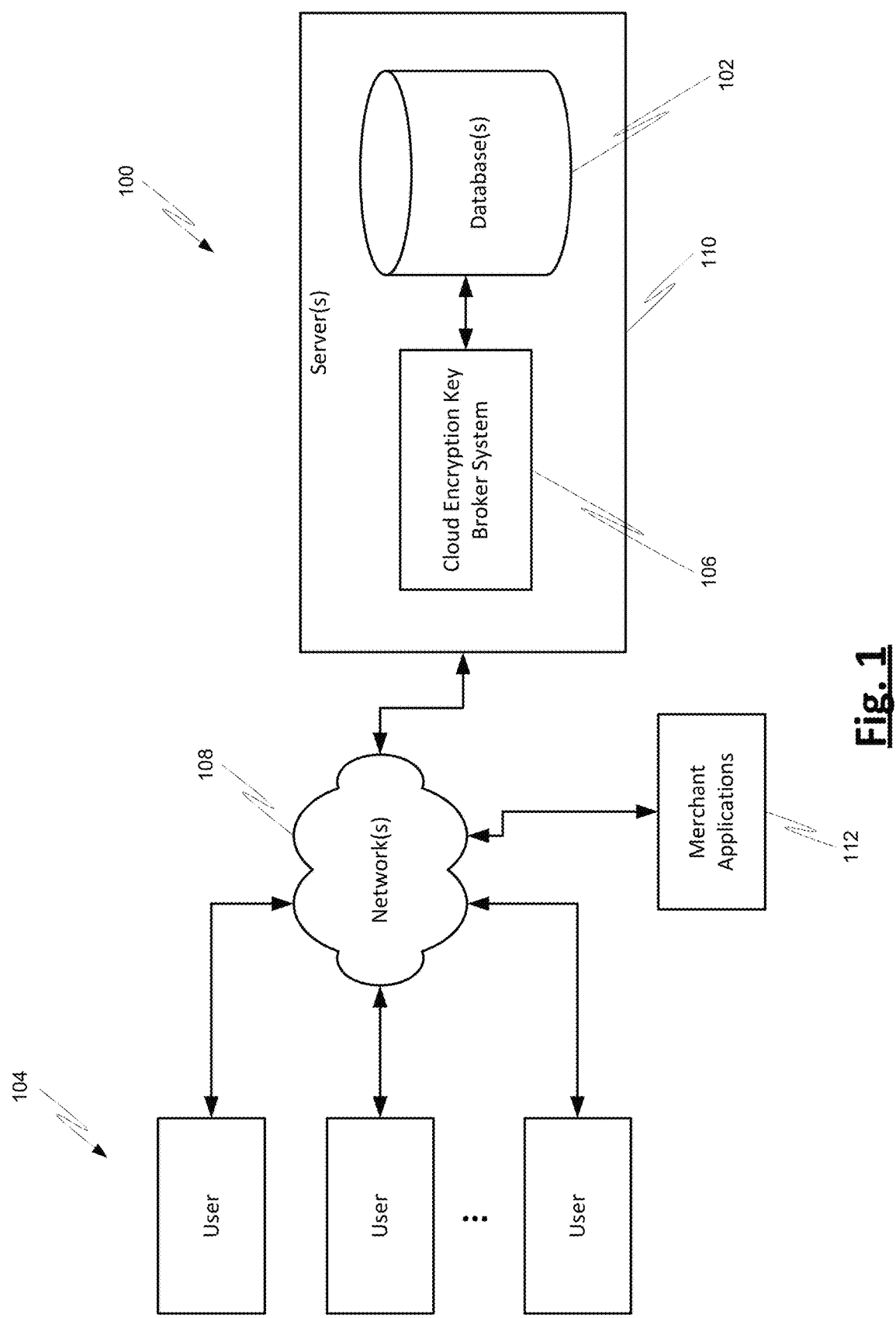
FIG. 1 is a block diagram depicting a cloud encryption key broker system.

FIG. 1 shows at 100 an example embodiment of a CEKB. The CEKB at 100 prevents theft of encryption/decryption keys by using a key broker system 106. The cloud encryption key broker system 106 stores the keys used in encryption/decryption operations in a secure manner to help prevent such theft. For example, the CEKB provides additional security when consumer users 104 purchase items via merchant applications 112.

The merchant applications 112 may be open to hacking, spoofing, and other security threats. As such, the encryption key broker system 106 stores securely the encryption/decryption keys against potential malicious activities that may occur during payment transaction processing or otherwise. However, it should be understood that the cloud encryption key broker system 106 is not limited to only purchasing-type transactions but may be used in many other types of operations outside of a financial/purchasing environment.

The consumer users 104 can directly or indirectly interact with a cloud encryption key broker system 106 through a number of ways, such as over one or more networks 108. Server(s) 110 accessible through the network(s) 108 can host the system 106. One or more data stores 102 can store the data to be analyzed and processed by the system 106 as well as any intermediate or final data generated by the system 106.

Figure 2:
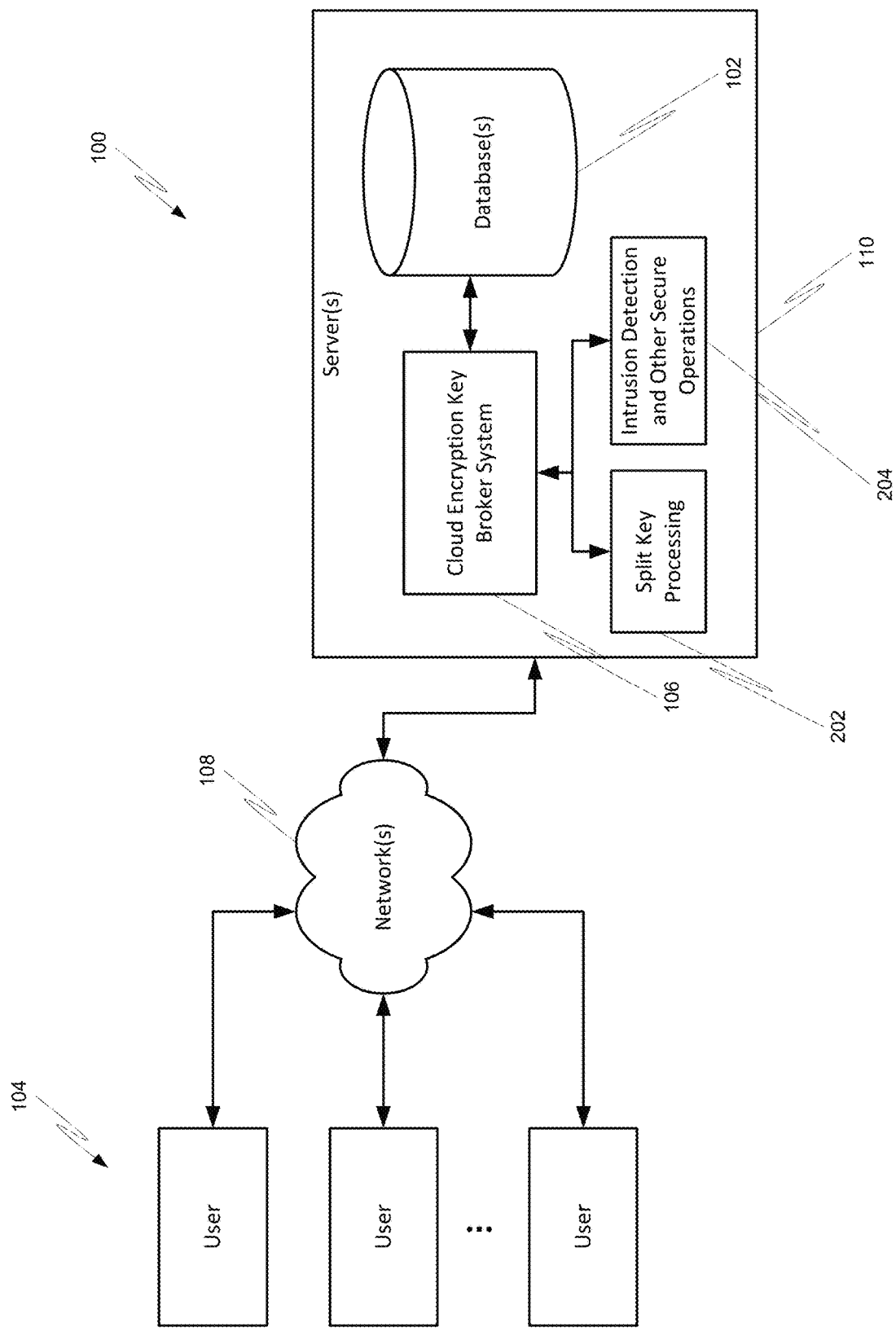
FIG. 2 is a block diagram depicting key processing and security-related operations associated with the cloud encryption key broker system.

FIG. 2 depicts another example embodiment where a payment processor provides a cloud service for secure operations. More specifically, the cloud service securely stores and transmits parts of encryption/decryption keys as shown at 202. Split key processing can include splitting the key in two and storing one of them on a remote secure server.

As an illustration, if the key were 123456, then the key would be split into two partial keys: 123 and 456. In this way, a hacker would have to breach a merchant's computer as well as bypass the remote secure server's security measures to gain access to the entire key. This approach prevents a hacker from breaching the system and stealing a key where a merchant has stored an encryption/decryption key on a secure computer.

The cloud service can also combine additional security via processing 204. Secure processing operations 204 can include techniques for detecting a network intrusion or other type of unauthorized access request.

Figure 3:
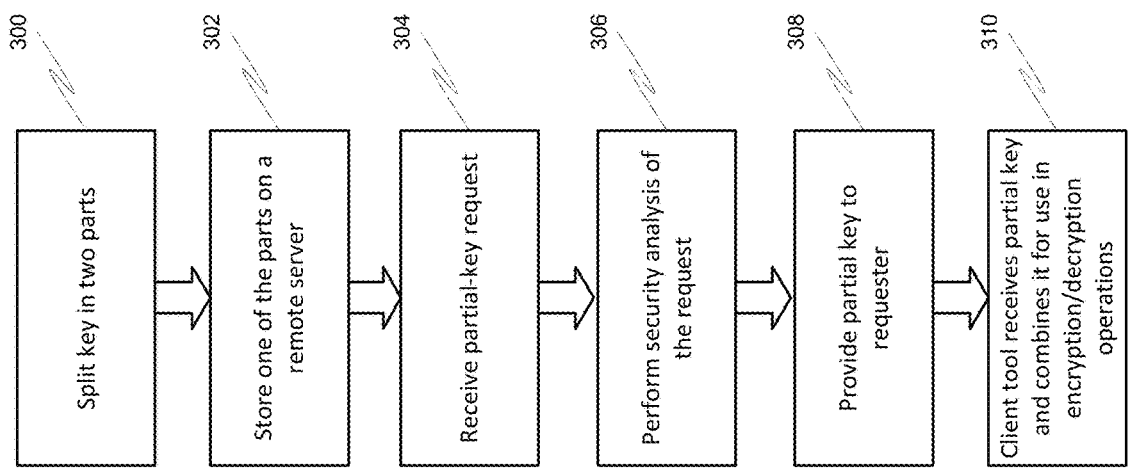
FIG. 3 is a process flow diagram illustrating an operational scenario involving the cloud encryption key broker system.

FIG. 3 shows an operational scenario example involving the encryption key broker system. At step 300, a key is split into two parts. It should be understood that the system could also include splitting the key into more than two parts. At step 302, one of the key parts is stored in a remote server. A partial-key request is subsequently received at step 304.

Security analysis is performed in this operational scenario upon the request at step 306. Such analysis at step 306 can include a combination of risk analysis of requests, IP blocking and access rule restrictions to securely store and transmit parts of encryption/decryption keys. For example, this can include at step 306 using artificial intelligence for intrusion detection. Prim's algorithm can also be used within step 306 for security operations. A description of the algorithm is provided in U.S. Pat. No. 8,924,270 entitled "Risk Assessment Rule Set Application For Fraud Prevention", which document is incorporated herein for all purposes. It should be understood that many other types of security operations can be performed upon the request for the presence of malicious or unauthorized activity.

If the security analysis does not indicate any inappropriate activity with respect to the request, the partial key is provided at step 308 to the requester. At step 310, a software tool at the client side receives the partial key and combines it with one or more other partial keys for use in encryption/decryption operations.

Figure 4:
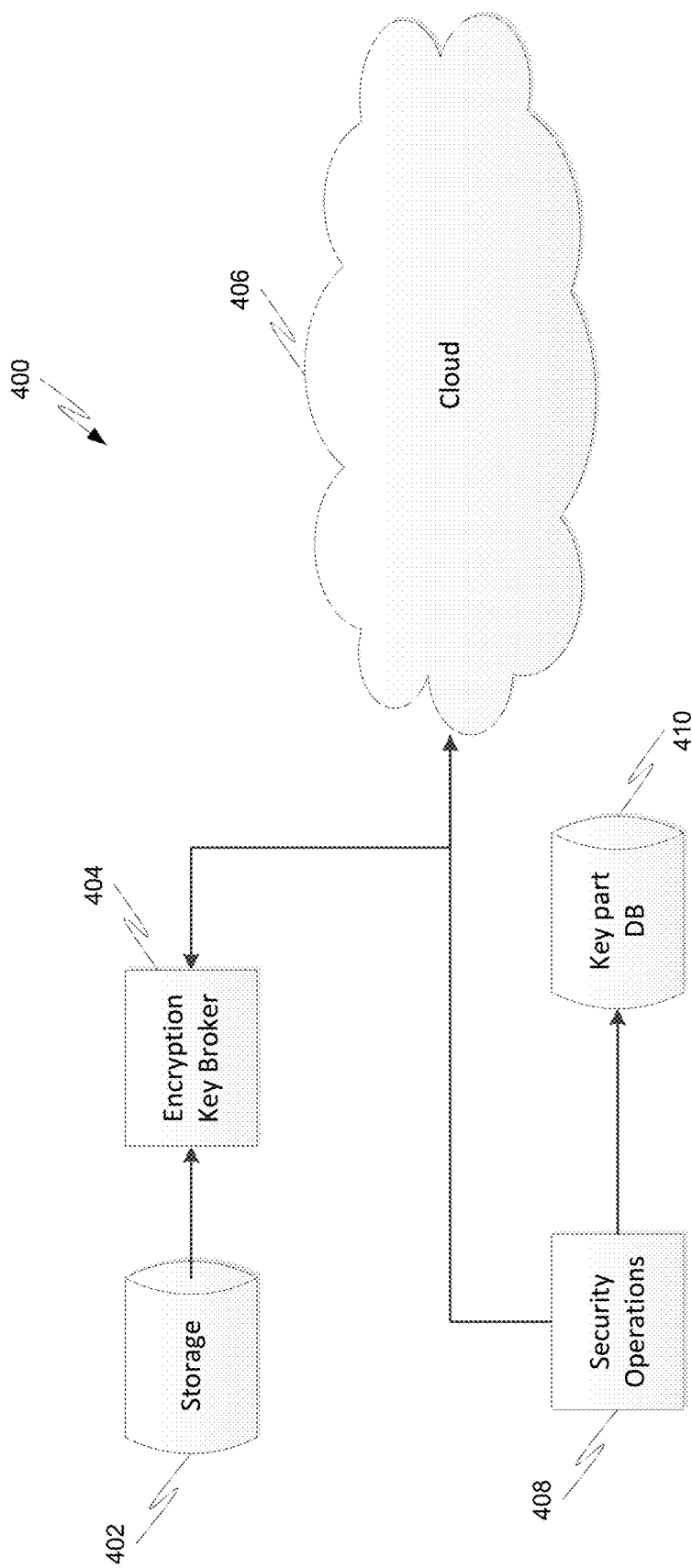
FIGS. 4-6 are block diagrams depicting security-related operations and key processing operations associated with the cloud encryption key broker system.

FIG. 4 depicts an embodiment of the CEKB at 400 where a cloud service is provided for securely storing and transmitting parts of encryption/decryption keys. The CEKB 400 stores at 410 parts of encryption/decryption keys remotely. In this embodiment, these keys can be retrieved (e.g. from the remote database 410) and only used at the client in temporary memory 402. In other embodiments, these keys can be retrieved and used at the client in memory and elsewhere such as in a type of secure memory.

A client tool known as the encryption key broker 404 (EKB) is provided that performs encrypting/decrypting routines. When started, the EKB 404 calls out to a remote server on the cloud 406 to provide the necessary parts to complete the data encryption/decryption key. The key parts are transmitted in an encrypted form. These parts are decrypted, combined and the resulting data key is stored in memory 402.

Figure 5:
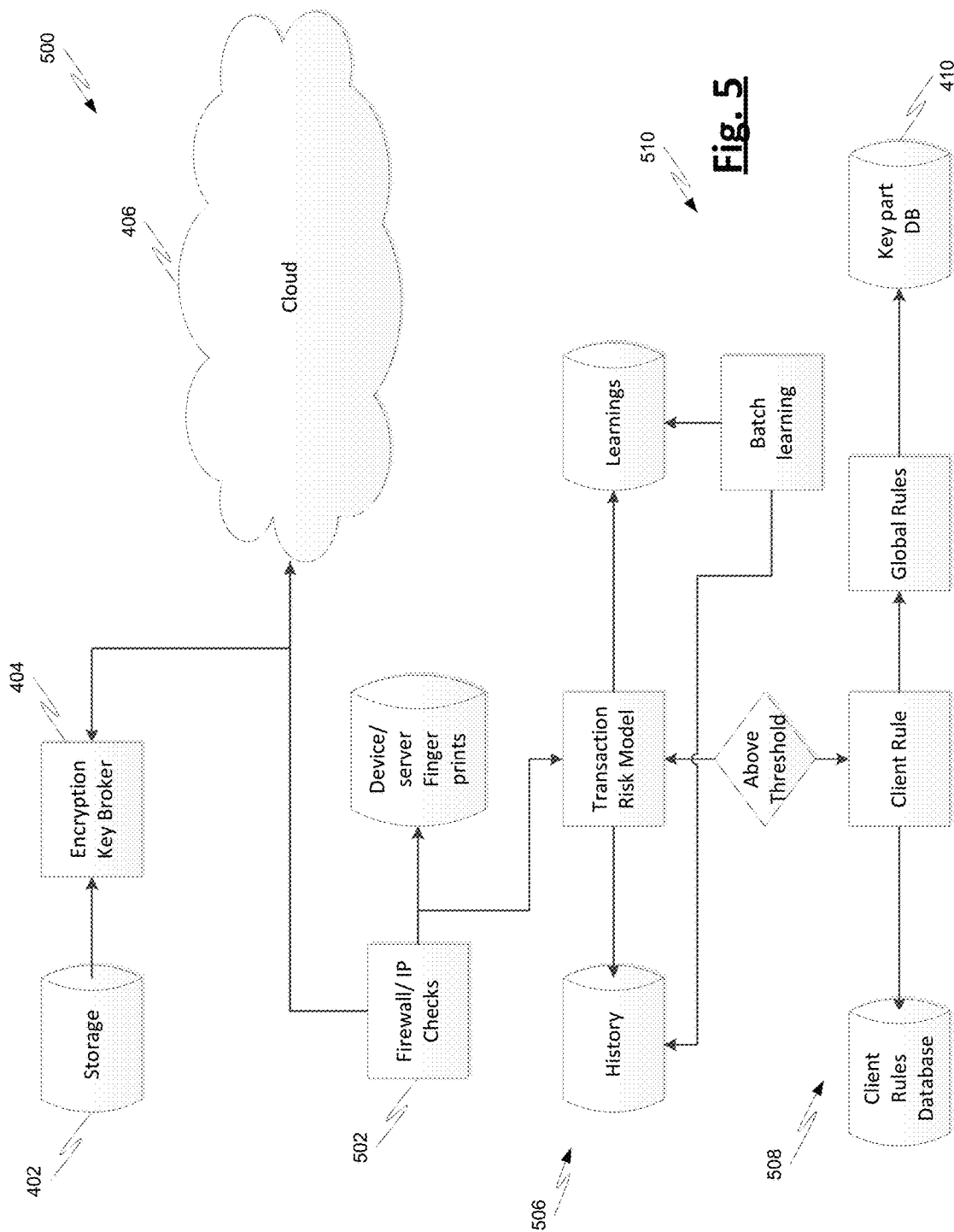

FIG. 5 depicts an embodiment of the CEKB at 500 where a cloud service is provided by a payment processor or other type of company that combines risk analysis of requests, IP blocking, and access rule restrictions to securely store and transmit parts of encryption/decryption keys. The CEKB 500 can also include layers of security techniques. For example, a real-time risk scoring model can be used as shown at 506 to evaluate each request and generate a risk score as well as IP checks 502.

Also as shown at 508, partners can define set rules, such as hours of the day or IP locations for restricting access. Batch risk models at 510 look for abnormal behavior across all partners. Keys involved in known breaches cannot be retrieved.

Figure 6:
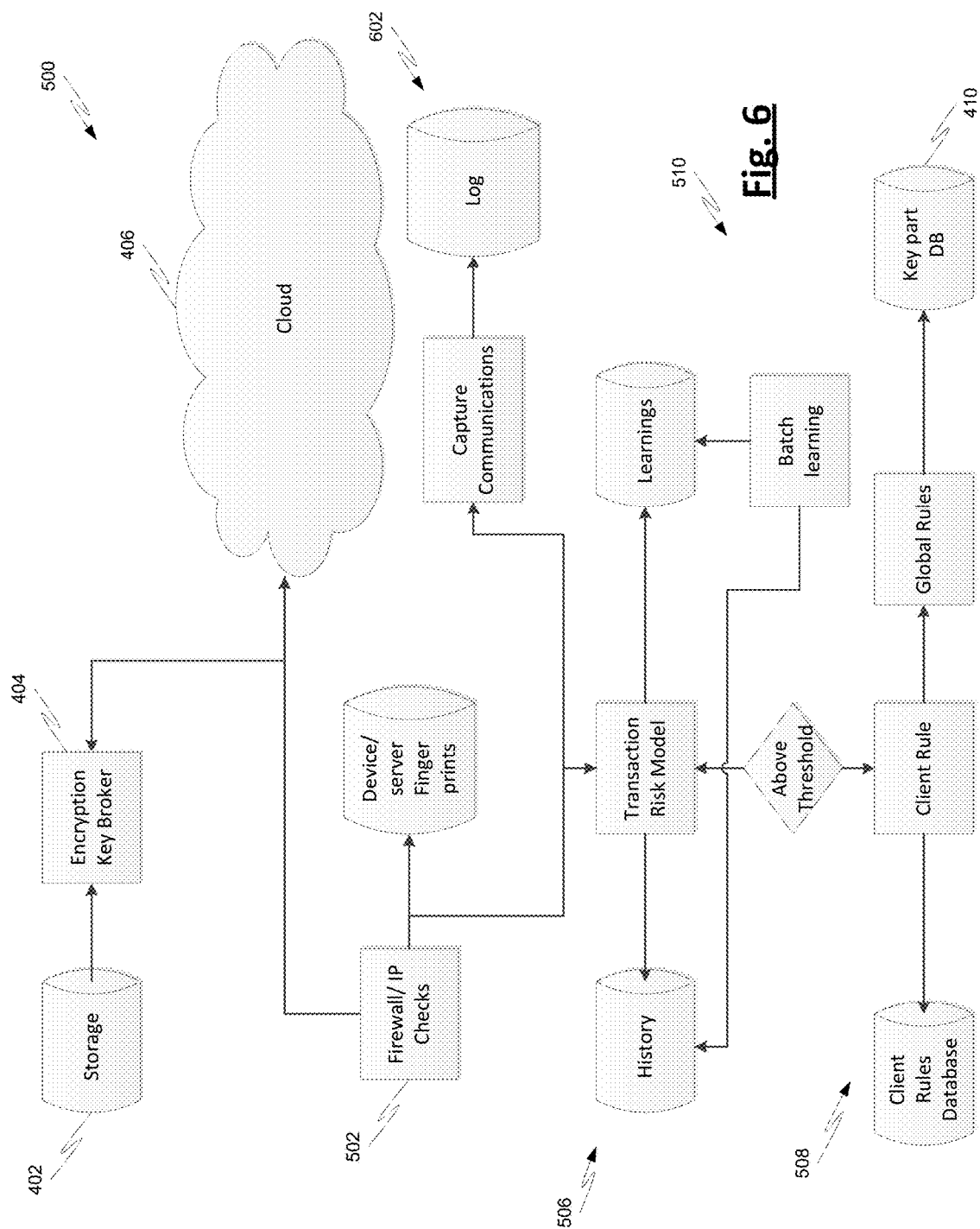

FIG. 6 illustrates that security analysis operations can be further extended. For example, all communications are logged and tracked as shown at 602. This enables rapid responses to identify the location of breaches. In the scenario depicted in FIG. 6, the CEKB may be used in many different types of scenarios, such as those involving remote transactions and payment requests. A "remote transaction" may include any transaction where one party to a transaction is separated by some distance and/or by a device from another party to a transaction. For example, a remote transaction may include a "card—not present," electronic commerce, or other online transaction performed through communication between two or more devices. For instance, remote transactions may include devices that are not present in the same location or multiple devices where the two parties (e.g., a merchant and a consumer) are not using the same device to complete the transaction. Additionally, a remote transaction may include an in-store transaction that is not completed using a merchant point-of-sale device (i.e., access device) and instead is completed by a consumer using their mobile device to communicate with a remote (or local) merchant server computer configured to process the remote transactions. Traditionally, remote transactions have had a higher chance of fraud because remote transactions do not allow a payee the opportunity to identify the payer or otherwise ensure that the payment they are receiving is legitimate, as the two parties are not present in the same location during the transaction (such as in a "card present" or in-store transaction). A local, card present, face-to-face, or in-store transaction may include a transaction where two or more parties to a transaction are present in the same location, use the same transaction device, or is performed through at least one present individual or entity to authenticate the identity of a payer and/or payee.

A "payment request" may include a message having a request to process or initiate a payment. For example, the payment request may be sent from mobile device associated with a consumer in relation to a purchase transaction associated with goods or services provided by a merchant. The payment request may include any relevant information to the transaction including payment information (e.g., account identifiers, personal information, etc.), transaction information (e.g., merchant information, items being purchased, etc.), device information (e.g., mobile device phone number, secure element identifier, etc.), routing information (e.g., internet protocol (IP) address of a destination computer, identifier for destination computer, bank identification number (BIN), etc.), and any other relevant information to a payment transaction. For example, a payment request may include encrypted payment information for a transaction and may be sent to a third party computer that is configured to authenticate the payment request, validate a public key certificate, decrypt the encrypted payment information, extract a public key from the validated certificate, re-encrypt the decrypted payment information, and send the re-encrypted payment information to a transaction processor for initiation of a payment transaction. Accordingly, the payment request may include any information relevant to the secure process for transmitting sensitive data to a merchant server for processing a remote transaction.

As used herein, "transaction information" may include any data associated with a transaction. For example, transaction information may include a transaction amount, transaction time, transaction date, merchant information (e.g., registered merchant identifier, address, merchant computer IP address, etc.), product information (e.g., serial numbers, product names or other identifiers, etc.). The transaction information may be provided to a mobile device by a merchant server computer before or after the consumer initiates a payment transaction through the merchant application. In some embodiments, the transaction information may be used to identify a specific merchant associated with a transaction using the merchant information included in the transaction information.

As used herein, "encrypted payment information" may include any payment information that has been made unintelligible to some parties to prevent unauthorized access to the payment information. For example, the encrypted payment information may not be read by a recipient without access to a shared secret or access to a designated encryption key. As such, the encrypted payment information may be made unintelligible through a process that is reversible and repeatable such that two entities can share information using a shared secret or encryption keys without unauthorized entities being able to understand or gain access to the sensitive payment information or sensitive payment credentials within the payment information (unless they gain access to the shared secret or encryption keys).

Figure 7:
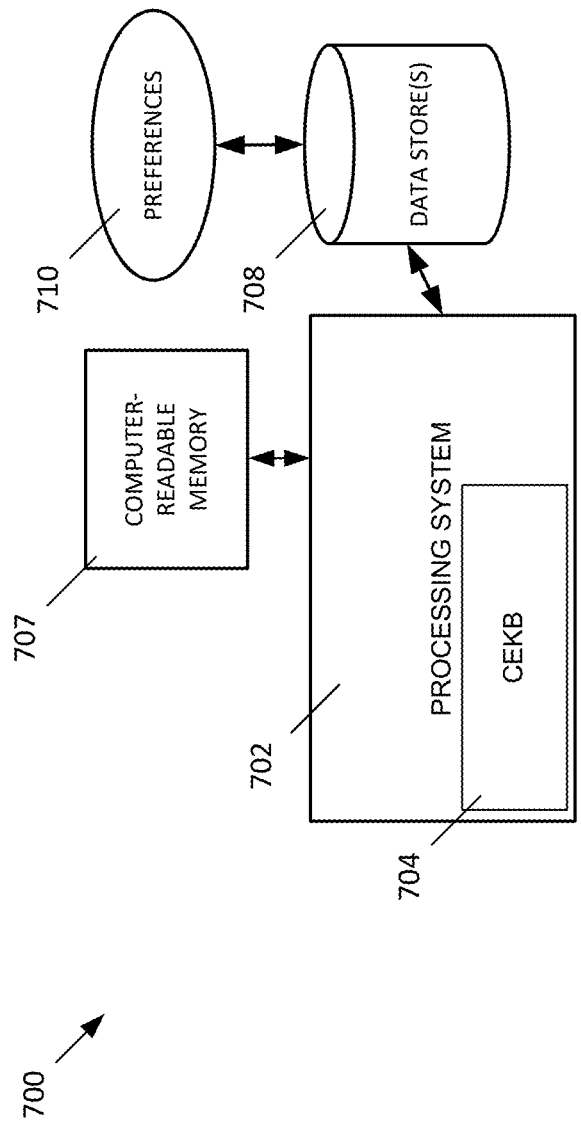
FIGS. 7 and 8 are block diagrams depicting additional computer-related environments within which a cloud encryption key broker system can operate.
Figure 8:
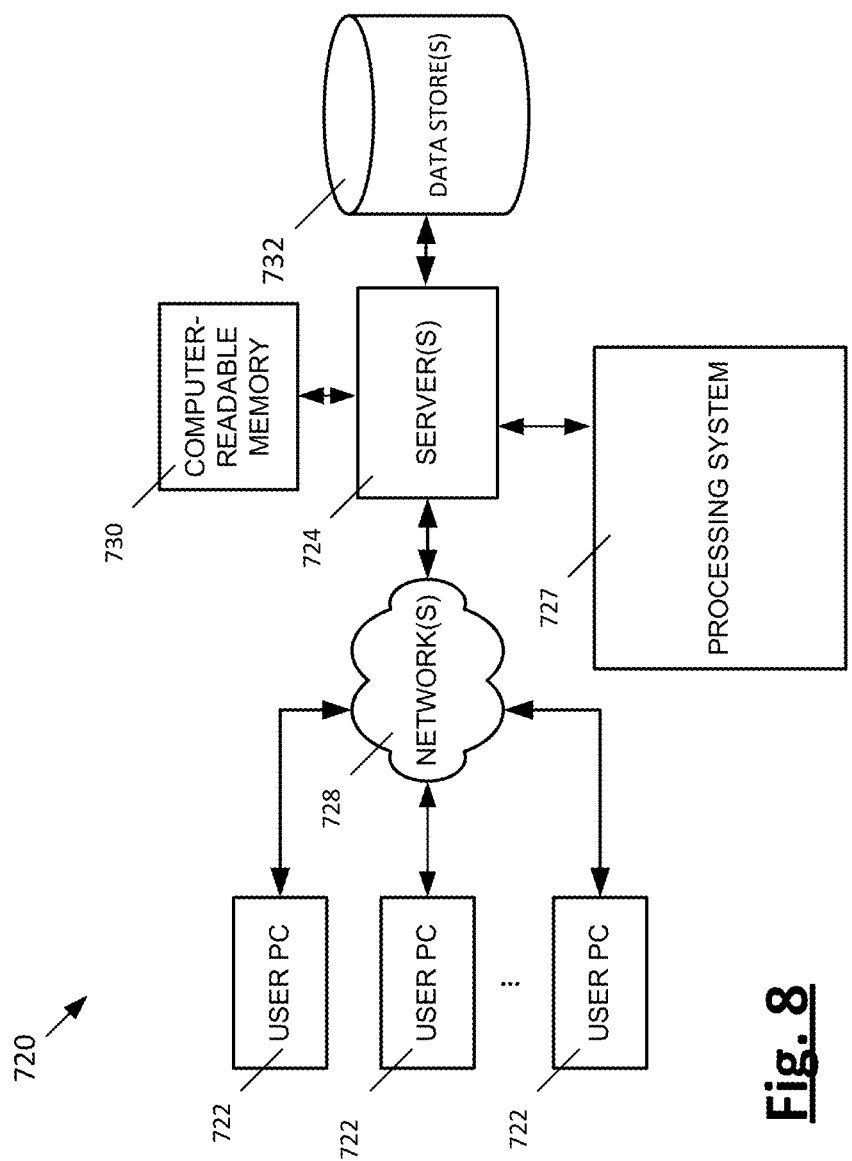

FIGS. 7 and 8 depict example systems for use with the operations disclosed herein. For example, FIG. 7 depicts an exemplary system 700 that includes a computer architecture where a processing system 702 (e.g., one or more computer processors located in a given computer or in multiple computers that may be separate and distinct from one another) includes a CEKB 704 being executed on the processing system 702. The processing system 702 has access to a computer-readable memory 707 in addition to one or more data stores 708. The one or more data stores 708 may include user preferences 710. The processing system 702 may be a distributed parallel computing environment, which may be used to handle very large-scale data sets.

FIG. 8 depicts a system 720 that includes a client-server architecture. One or more user PCs 722 access one or more servers 724 running a CEKB system 737 on a processing system 727 via one or more networks 728. The one or more servers 724 may access a computer-readable memory 730 as well as one or more data stores 732.

In FIGS. 7 and 8, computer readable memories (e.g., at 707) or data stores (e.g., at 708) may include one or more data structures for storing and associating various data used in the example systems. For example, a data structure stored in any of the aforementioned locations may be used to store data including user preferences, etc.

Each of the element managers, real-time data buffer, conveyors, file input processor, database index shared access memory loader, reference data buffer and data managers may include a software application stored in one or more of the disk drives connected to the disk controller, the ROM and/or the RAM. The processor may access one or more components as required.

A display interface may permit information from the bus to be displayed on a display in audio, graphic, or alphanumeric format. Communication with external devices may optionally occur using various communication ports.

In addition to these computer-type components, the hardware may also include data input devices, such as a keyboard, or other input device, such as a microphone, remote control, pointer, mouse and/or joystick.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein and may be provided in any suitable language such as C, C++, JAVA, for example, or any other suitable programming language. Other implementations may also be used, however, such as firmware or even appropriately designed hardware configured to carry out the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure.

What is claimed is:

1. A processor-implemented method for use in cryptographic operations to prevent theft of encryption keys in payment processing, comprising:

generating, at a key broker server, a key in processing a remote transaction on a client device of a user between the user and a merchant via a merchant application;

splitting, at the key broker server, the key into a first portion and a second portion;

sending the second portion of the key from the key broker server to the client device;

storing, by one or more data processors accessible by the key broker server, the first portion of the key, at the key broker server in a secure fashion;

receiving, at the key broker server, a remote payment request from the client device for retrieval of the first portion of the key corresponding to the second portion of the key;

in response to receiving the remote payment request, performing, at the key broker server, a security analysis upon the remote payment request according to a security analysis criteria; and transmitting the first portion of the key from the key broker server to the client device after the security analysis criteria has been satisfied;

wherein the key is reconstituted at the client device by combining the first portion of the key with the second portion of the key;

wherein the reconstituted key is only available to the client device after the remote payment request meets the security analysis criteria and the first portion of the key is provided to the client device, wherein the client device uses the reconstituted key to complete the remote transaction at the client device, wherein the reconstituted key is stored on the client device only in temporary memory or other secure type memory.

2. The method of claim 1, wherein a cloud-based service is used for the storing of the first portion of the key.

3. The method of claim 1, wherein the cloud-based service is provided by a payment processing entity.

4. The method of claim 1, wherein the reconstituted key is generated by combining the first portion of the key with the second portion of the key and with one or more additional portions of the key.

5. The method of claim 1, wherein the remote transaction comprises an encryption operation.

6. The method of claim 1, wherein the remote transaction comprises a decryption operation.

7. The method of claim 1, wherein the security analysis includes IP checks, risk analysis of requests, IP blocking, and access rule restrictions.

8. The method of claim 7, wherein the security analysis criteria includes the security analysis not detecting any unauthorized access or malicious activity associated with the remote payment request.

9. The method of claim 1, wherein the remote transaction comprises a "card—not present" transaction, an in-store transaction not completed using a merchant point-of-sale (POS) device, or a transaction involving devices of the user and merchant that are not at the same location.

10. The method of claim 1, wherein transmitting the first portion of the key in an encrypted form.

11. A processor-implemented system for use with cryptographic operations to prevent theft of encryption keys in payment processing, comprising:
   a memory; and
   one or more processors disposed in communication with the memory and configured to issue processing instructions stored in the memory to:
   generate, at a key broker, a key in processing a remote transaction on a client device of a user between the user and a merchant via a merchant application;
   store a first portion of the key, at the key broker;
   send a second portion of the key to the client device;
   receive a payment request from the client device for retrieval of the first portion of the key;
   in response to receiving the payment request, perform a security analysis on the payment request to determine compliance to a security analysis criteria, wherein the security analysis includes IP checks, risk analysis of requests, IP blocking, and access rule restrictions; and
   transmit the first portion of the key from the key broker to the client device responsive to the security analysis criteria being satisfied;
   wherein the key is reconstituted by combining the first portion of the key with the second portion of the key;
   wherein the reconstituted key is used to complete the remote transaction at the client device.

12. The processor-implemented system of claim 11, wherein the one or more processors are configured to store the first portion of the key with a cloud-based service.

13. The processor-implemented system of claim 11, wherein the cloud-based service is provided by a payment processing entity.

14. The processor-implemented system of claim 11, wherein the reconstituted key is generated by combining the first portion of the key with the second portion of the key and with one or more additional portions of the key.

15. The processor-implemented system of claim 11, wherein the remote transaction comprises an encryption operation or a decryption operation.

16. The processor-implemented system of claim 11, wherein the reconstituted key is stored on the client device only in temporary memory or other secure type memory.

17. The processor-implemented system of claim 11, wherein the security analysis criteria includes the security analysis not detecting any unauthorized access or malicious activity associated with the payment request.

18. The processor-implemented system of claim 11, wherein the remote transaction comprises a "card—not present" transaction, an in-store transaction not completed using a merchant point-of-sale (POS) device, or a transaction involving devices of the user and merchant that are not at the same location.

19. The processor-implemented system of claim 18, wherein the one or more processors are configured to transmit the first portion of the key.

20. A non-transitory tangible processor-readable medium storing processor-issuable instructions to:
   generate, at a key broker, a key for processing a payment transaction on a client device of a user between the user and a merchant via a merchant application;
   split, at the key broker, the key into a first portion and a second portion;
   send the second portion of the key from the key broker to the client device;
   receive a payment request from the client device for retrieval of the first portion of the key corresponding to the second portion of the key;
   in response to receiving the payment request, perform, at the key broker, a security analysis criteria upon the payment request; and
   transmit the first portion of the key, from the key broker to the client device after the security analysis criteria has been satisfied;
   wherein the key is reconstituted at the client device by combining the first portion of the key with the second portion of the key;
   wherein the reconstituted key at the client device is used to complete the payment transaction at the client device, wherein the payment transaction comprises a "card—not present" transaction, an in-store transaction not completed using a merchant point-of-sale (POS) device, or a transaction involving devices of the user and merchant that are not at the same location.

* * * * *